United States Patent
V

(10) Patent No.: US 12,532,339 B2
(45) Date of Patent: Jan. 20, 2026

(54) ALLOCATION OF MULTI RESOURCE UNITS TO Wi-Fi STATIONS

(71) Applicant: Fortinet, Inc., Sunnyvale, CA (US)

(72) Inventor: Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 298 days.

(21) Appl. No.: 18/092,297

(22) Filed: Dec. 31, 2022

(65) Prior Publication Data
US 2024/0224310 A1   Jul. 4, 2024

(51) Int. Cl.
  *H04W 72/52* (2023.01)
  *H04L 5/00* (2006.01)
  *H04W 84/12* (2009.01)

(52) U.S. Cl.
  CPC ........... *H04W 72/52* (2023.01); *H04L 5/0007* (2013.01); *H04W 84/12* (2013.01)

(58) Field of Classification Search
  CPC .... H04W 72/52; H04W 84/12; H04L 5/0007; H04L 5/0037
  See application file for complete search history.

(56) References Cited

U.S. PATENT DOCUMENTS

| | | | |
|---|---|---|---|
| 2016/0285775 A1* | 9/2016 | Damnjanovic | H04L 47/30 |
| 2020/0014576 A1* | 1/2020 | Cherian | H04L 1/0026 |
| 2020/0154483 A1 | 5/2020 | Han et al. | |
| 2021/0076437 A1 | 3/2021 | Kneckt et al. | |
| 2021/0127307 A1 | 4/2021 | Huang et al. | |
| 2021/0176785 A1 | 6/2021 | Jang et al. | |
| 2021/0204291 A1* | 7/2021 | Anand | H04L 5/0007 |
| 2023/0120347 A1 | 4/2023 | Sun et al. | |
| 2024/0008013 A1 | 1/2024 | Dong | |

OTHER PUBLICATIONS

Cailian Deng et al "IEEE 802.11be Wi-Fi 7: New Challenges and Opportunities" IEEE Communications Surveys & Tutorials, vol. 22, No. 4, Fourth Quarter 2020 (Year: 2020).*

* cited by examiner

*Primary Examiner* — Sun Jong Kim
(74) *Attorney, Agent, or Firm* — Law Office of Dorian Cartwright; Dorian Cartwright

(57) ABSTRACT

A size of a data packet being transmitted downlink to a specific Wi-Fi 7 client is determined from real-time data traffic. A number of small tones and large tones needed in combination for the data packet transmission, either alone or in combination, is calculated. The combination of small RU tones and large RU tones is allocated to the specific wireless client for use in downlink. The data packet is transmitted downlink to the Wi-Fi 7 client across the combination of small and large RU tones.

5 Claims, 5 Drawing Sheets

ALLOCATION OF MULTI RESOURCE UNITS TO Wi-Fi STATIONS

FIELD OF THE INVENTION

The invention relates generally to computer security, and more specifically, for assigning allocation sizes of resource units (RUs) tones to Wi-Fi 7 stations based on frame sizes of network traffic.

BACKGROUND

In wireless networking, stations share airtime for communications with a common access point. More specifically, under Wi-Fi 5, access points allocated an entire channel to only one client at a time. Then, under Wi-Fi 6 orthogonal frequency-division multiple access (OFMDA) The frequency spectrum within the channel can be, for example, 20 MHz, 40 MHz or 80 MHz. Under Wi-Fi 7 (IEEE 802.11be), multiple RU tones within a spectrum can be assigned to a single station.

Problematically, Wi-Fi 7 does not provide

What is needed is a robust technique for allocating combinations of RU tone sizes to Wi-Fi 7 stations based on frame sizes of network traffic.

SUMMARY

To meet the above-described needs, methods, computer program products, and systems for assigning allocation sizes of RU tones to Wi-Fi 7 stations based on frame sizes of network traffic.

In one embodiment, one or more Wi-Fi 7 clients are connected to a Wi-Fi 7 access point to transmit data. RU allocation sizes are determined. In an embodiment, a combination of sizes are determined for a data packet. In another embodiment, a combination of sizes are determined for a group of data packets.

In still another embodiment, a size of a data packet being transmitted downlink to a specific Wi-Fi 7 client is determined from real-time data traffic. A number of small tones and large tones needed in combination for the data packet transmission, either alone or in combination, is calculated. The combination of small RU tones and large RU tones is allocated to the specific wireless client for use in downlink. The data packet is transmitted downlink to the Wi-Fi 7 client across the combination of small and large RU tones.

Advantageously, network performance and computer performance are improved with more efficient access point spectral use.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for allocating combinations of RU tone sizes to Wi-Fi 7 stations based on frame sizes of network traffic. One of ordinary skill in the art will recognize many alternative embodiments that are not explicitly listed based on the following disclosure. For example, Wi-Fi 7 is used for illustrative purposes herein, but the same techniques can be applied to other wireless protocols with similar characteristics.

I. Systems for RU Allocation Based on Frame Size (FIGS. 1-2)

Figure 1:
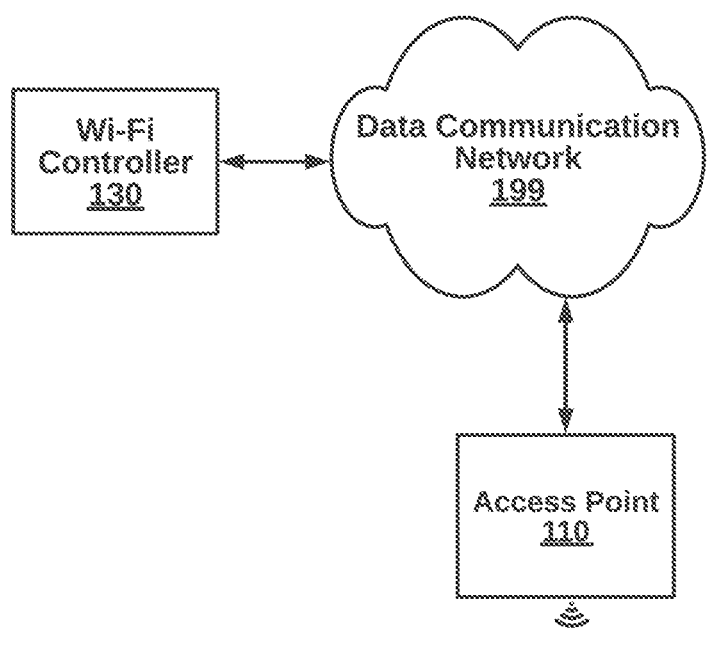
FIG. 1 is a high-level block diagram illustrating a system for allocating combinations of RU tone sizes to Wi-Fi 7 stations based on frame sizes of network traffic, according to one embodiment.
Figure 1:
Figure 2:
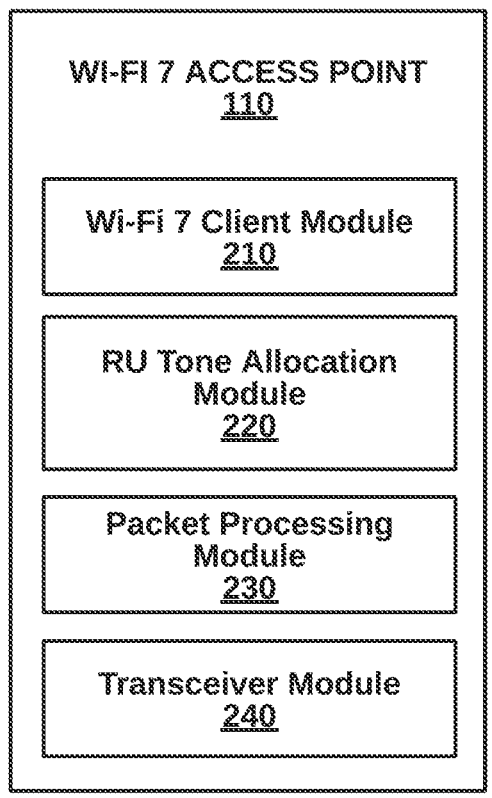
FIG. 2 is a more detailed block diagram illustrating a Wi-Fi 7 access point of the system of FIG. 1, according to one embodiment.

FIG. 1 is a high-level block diagram illustrating a system 100 for allocating combinations of RU tone sizes to Wi-Fi 7 stations based on frame sizes of network traffic, according to one embodiment. The system 100 includes a Wi-Fi 7 access point 110, a station 120, and a Wi-Fi controller 130. Other embodiments of the system 100 can include additional components that are not shown in FIG. 1, such as additional access points, additional stations, network gateways, routers, and switches, without limitation.

In one embodiment, the components of the automatic system 100 are coupled in communication over a private network connected to a public network, such as the Internet. In another embodiment, system 100 is an isolated, private network. The components can be connected to the data communication system via hard wire (e.g., access point 110, Wi-Fi controller 130). The components can also be connected via wireless networking (e.g., station 120). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, and the like. Components can use IPv4 or IPv6 address spaces.

The Wi-Fi 7 access point 110 allocates different sizes of RU tones for different sizes of data packets. For example, smaller size RU tones can be assigned to 300 bytes and larger size RU tones assigned to 300 bytes and larger. The sizes can be automatically adjusted by machine learning to adapt with current conditions of network traffic. In yet another embodiment, combinations of sizes are used for a single data packet, for example one smaller size RU tone and one larger size RU tone. The RU data is included in the preamble of a data packet by the Wi-Fi 7 access point 110 (e.g., HE_MU_PPDU preamble). Using RU tones, multiple transmissions can go out from access point to different clients.

The Wi-Fi 7 station 120 are capable of Wi-Fi 7 communications, using OFDMA. Legacy communications such as Wi-Fi 6 and Wi-Fi 5 can also be deployed. Transceivers and software are compatible with Wi-Fi 7 specifications.

The Wi-Fi controller 130 can centrally manage a group of access points. In this case, when stations roam from one access point to another access point under the same Wi-Fi controller, historical information can be quickly retrieved for applying uniform policies during roaming. Thus, when a new client roams to the Wi-Fi 7 access point 110, the Wi-Fi controller can send data about historical RU allocation for use in current RU allocations.

FIG. 2 is a more detailed block diagram illustrating the Wi-Fi 7 access point 110 of the system of FIG. 1, according to one embodiment. The Wi-Fi 7 access point 110 includes a Wi-Fi 7 client module 210, an RU tone allocation module 220, a packet processing module 230, and a transceiver module 240. The components can be implemented in hardware, software, or a combination of both.

The Wi-Fi 7 client module 210 connects one or more Wi-Fi 7 clients to transmit data according to Wi-Fi 7 data format. Once associated and authenticated, data packets can be sent downlink to the connected client. Uplink data packets can be received and processed.

The RU tone allocation module 220 can determine a size of a data packet being transmitted downlink to a specific Wi-Fi 7 client. Then, the RU tone allocation module 220 can calculate a number of small tones and large tones needed in combination for the data packet transmission. The combination of small RU tones and large RU tones are allocated for use in downlink to the specific wireless client. Some embodiments include uplink OFDMA transmissions as well.

The packet processing module 230 identifies Wi-Fi 7 data packets and transmits according to RU tone allocations. The transceiver module 240 transmits the data packet downlink to the Wi-Fi 7 client across the combination of small and large RU tones.

Figure 4:
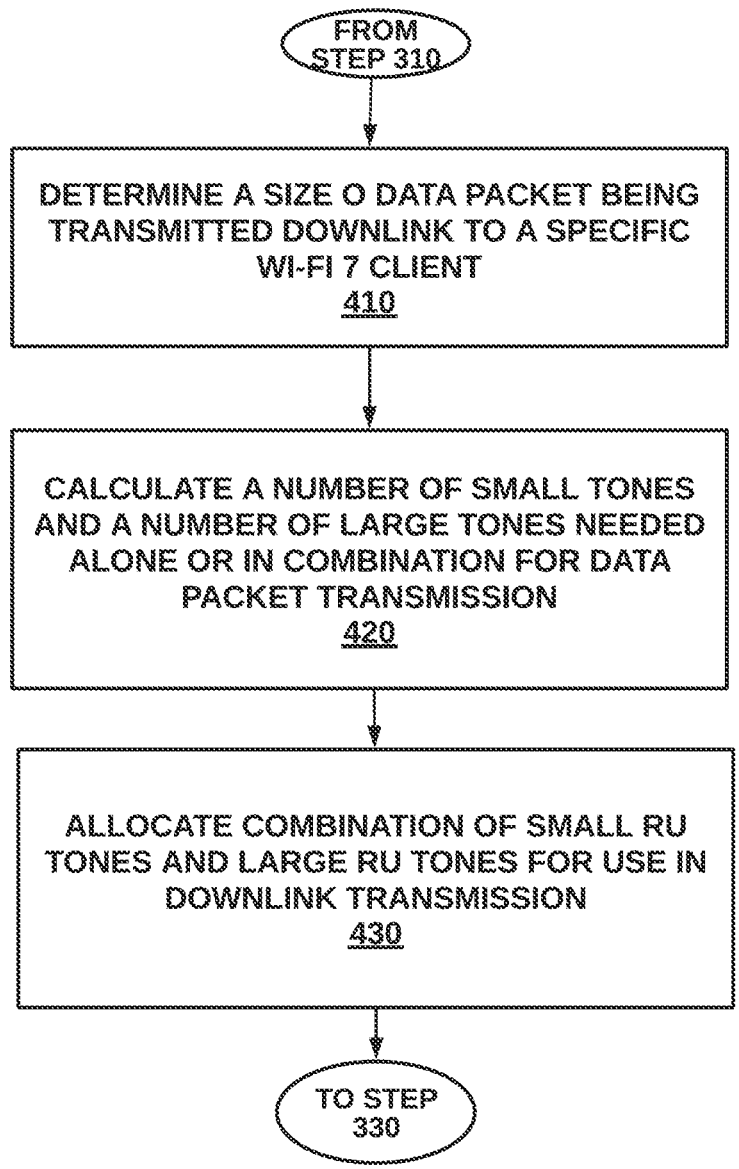
FIG. 4 is a more detailed flow diagram illustrating a step for calculating a combination of RU tones needed for transmission, either alone or in combination, from the method of FIG. 3, according to an embodiment.
Figure 5:
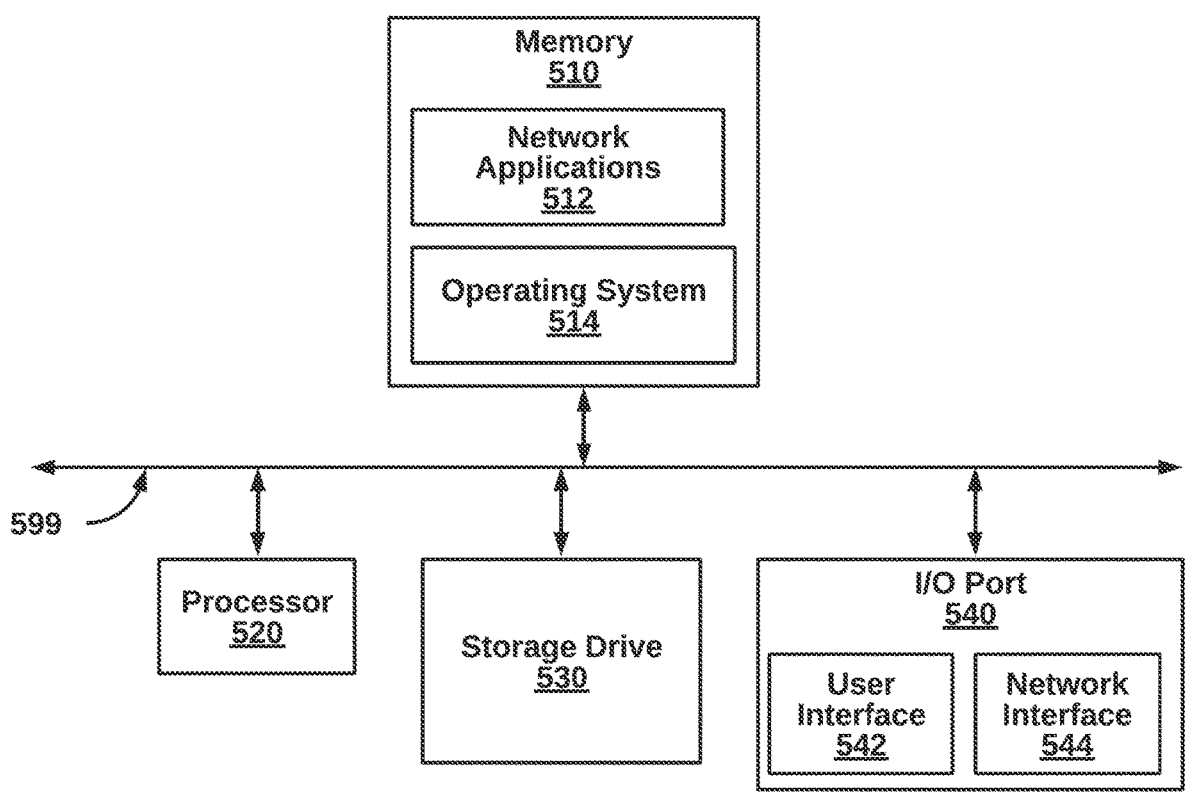
FIG. 5 is a block diagram illustrating an example computing device for the system of FIG. 1, according to one embodiment.

II. Methods for RU Allocation Based on Frame Size (FIGS. 4-5)

Figure 3:
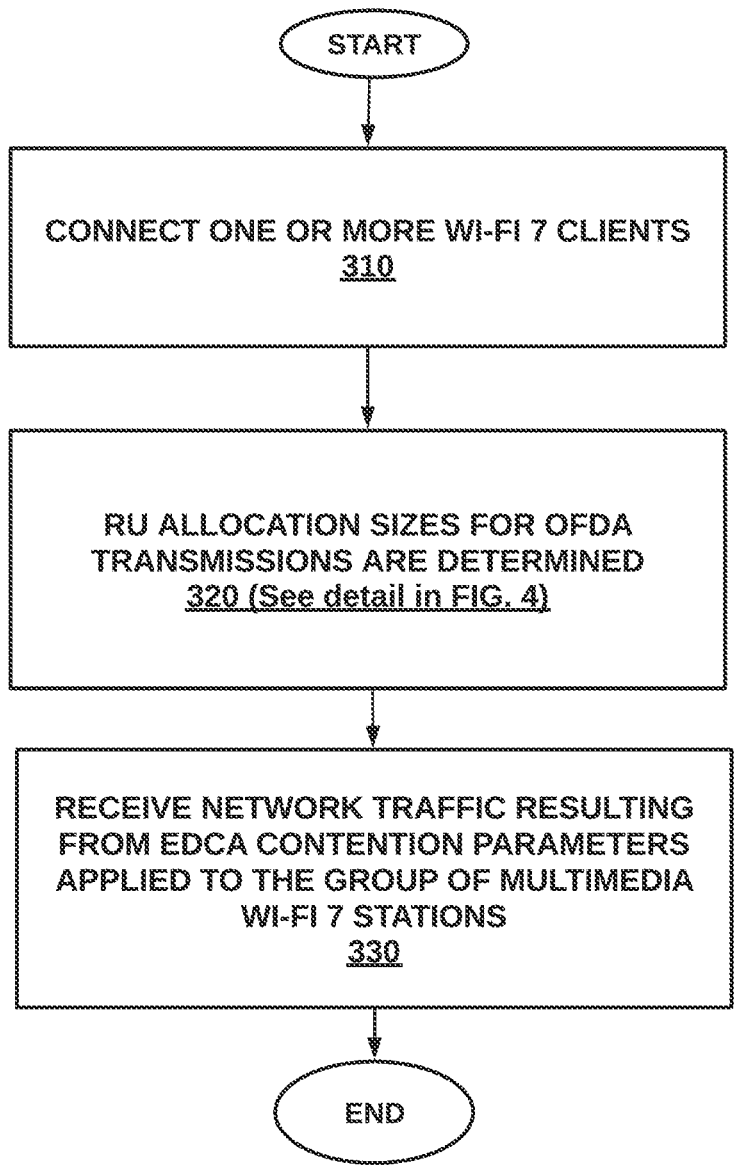
FIG. 3 is a high-level flow diagram illustrating a method for allocating combinations of RU tone sizes to Wi-Fi 7 stations based on frame sizes of network traffic, according to one embodiment.

FIG. 3 is a high-level flow diagram illustrating a method 300 for assigning allocation sizes of RU tones to Wi-Fi 7 stations based on frame sizes of network traffic, according to one embodiment. The method 300 can be implemented by, for example, system 100 of FIG. 1.

At step 310, a Wi-Fi 7 client module connects one or more Wi-Fi 7 clients to transmit data according to Wi-Fi 7 data format.

At step 320, RU allocation size are determined. In one embodiment, a combination of sizes are determined for a data packet. In another embodiment, a combination of sizes are determined for a group of data packets. One example of step 320 is shown in FIG. 4. At step 410, a size of a data packet being transmitted downlink to a specific Wi-Fi 7 client is determined. At step 420, a number of small tones and large tones needed in combination for the data packet transmission is calculated. At step 430, the combination of small RU tones and large RU tones is allocated to the specific wireless client for use in downlink.

Returning to FIG. 3, at step 330, the data packet is transmitted downlink to the Wi-Fi 7 client across the combination of small and large RU tones.

III. Computing Device for RU Allocation Based on Frame Size (FIG. 5)

FIG. 5 is a block diagram illustrating a computing device 500 for use in the system 100 of FIG. 1, according to one embodiment. The computing device 500 is a non-limiting example device for implementing each of the components of the system 100, including an EPCS server 105, access point 110, and stations 120A, 120B and 122. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, for example.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-10), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access applications—specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples).

For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a Wi-Fi 7 access point on a wireless local access network (WLAN), at least partially implemented in hardware, for allocating combinations of resource unit (RU) sizes to one or more Wi-Fi 7 stations based on frame sizes of network traffic, the method comprising:
    connecting the one or more Wi-Fi 7 stations to transmit data according to Wi-Fi 7 data format;
    determining a size of a data packet being transmitted downlink to a specific Wi-Fi 7 station of the one or more Wi-Fi 7 stations;
    calculating a number of small RU tones with a first size and large RU tones with a second size larger than the first size needed in combination for the data packet transmission;
    allocating the combination of the small RU tones and the large RU tones to the specific wireless station for use in downlink;
    transmitting the data packet downlink to the specific Wi-Fi 7 station across the combination of the small RU tones and the large RU tones, and wherein the small RU tones are allocated for frame sizes under 300 bytes, and the large RU tones are allocated for frame sizes at or greater than 300 bytes.

2. The method of claim 1, wherein the step of transmitting the data packet down to the specific Wi-Fi 7 station comprises transmitting the data packet using orthogonal frequency division multiple access (OFDMA).

3. The method of claim 1, wherein the combination of the small RU tones and the large RU tones is applied to a group of data packets, and wherein the data packets are distributed using the combination of the small RU tones and the large RU tones.

4. A non-transitory computer-readable medium in a Wi-Fi 7 access point on a wireless local access network (WLAN), at least partially implemented in hardware, storing instructions that, when executed by a processor, perform a computer-implemented method for allocating combinations of resource unit (RU) sizes to one or more Wi-Fi 7 stations based on frame sizes of network traffic, the method comprising:
    connecting the one or more Wi-Fi 7 stations to transmit data according to Wi-Fi 7 data format;
    determining a size of a data packet being transmitted downlink to a specific Wi-Fi 7 station of the one or more Wi-Fi 7 stations;
    calculating a number of small RU tones with a first size and large RU tones with a second size larger than the first size needed in combination for the data packet transmission;
    allocating the combination of the small RU tones and the large RU tones to the specific wireless station for use in downlink; and
    transmitting the data packet downlink to the specific Wi-Fi 7 station across the combination of the small RU tones and the large RU tones, and
    wherein the small RU tones are allocated for frame sizes under 300 bytes, and the large RU tones are allocated for frame sizes at or greater than 300 bytes.

5. A Wi-Fi 7 access point on a wireless local access network (WLAN), at least partially implemented in hardware, for allocating combinations of resource unit (RU) sizes to one or more Wi-Fi 7 stations based on frame sizes of network traffic, the Wi-Fi 7 access point comprising:
    a processor;
    a network interface communicatively coupled to the processor and to the WLAN; and a memory communicatively coupled to the processor and storing:
   a Wi-Fi 7 client module executed by the processor to connect the one or more Wi-Fi 7 stations to transmit data according to Wi-Fi 7 data format; and
   an RU tone allocation module executed by the processor to determine a size of a data packet being transmitted downlink to a specific Wi-Fi 7 station,
   the RU tone allocation module further executed by the processor to calculate a number of small RU tones with a first size and large RU tones with a second size larger than the first size needed in combination for the data packet transmission, and
   the RU tone allocation module further executed by the processor to allocate the combination of the small RU tones and the large RU tones to the specific wireless station for use in downlink, and
   wherein the network interface transmits the data packet downlink to the specific Wi-Fi 7 station across the combination of the small RU tones and the large RU tones, and
   wherein the small RU tones are allocated for frame sizes under 300 bytes, and the large RU tones are allocated for frame sizes at or greater than 300 bytes.

* * * * *